Figure 1:
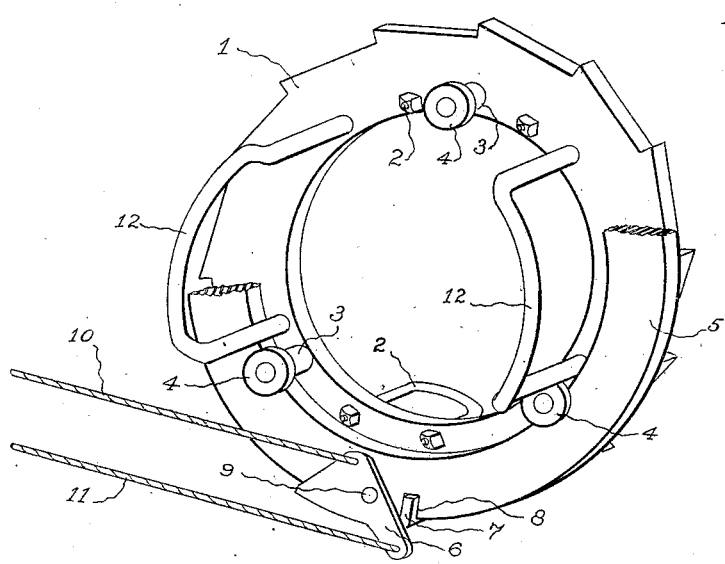

D. A. CALLAWAY.
SAFETY HITCHING DEVICE FOR VEHICLES DRAWN BY HORSES
APPLICATION FILED DEC. 6, 1907.

924,731.

Patented June 15, 1909.
2 SHEETS—SHEET 1.

Witnesses.

Inventor.

David Abram Callaway

D. A. CALLAWAY.
SAFETY HITCHING DEVICE FOR VEHICLES DRAWN BY HORSES.
APPLICATION FILED DEC. 6, 1907.
924,731.
Patented June 15, 1909.
2 SHEETS—SHEET 2.
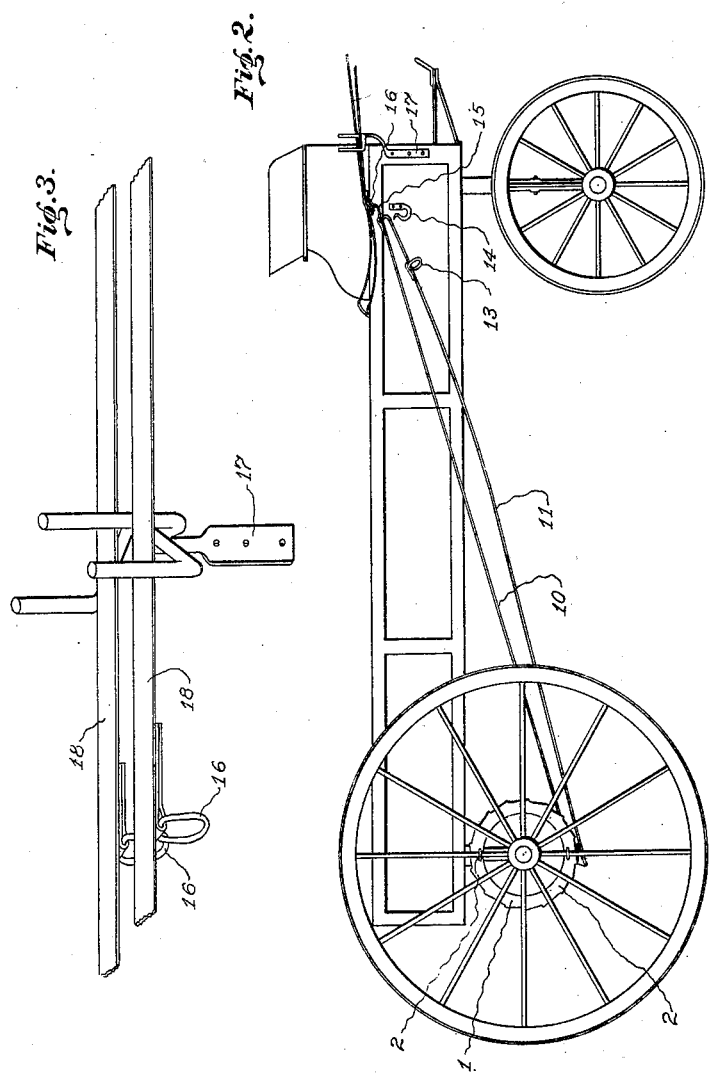
Witnesses.
Inventor.
David Abram Callaway

UNITED STATES PATENT OFFICE.

DAVID ABRAM CALLAWAY, OF PUEBLO, COLORADO.

SAFETY HITCHING DEVICE FOR VEHICLES DRAWN BY HORSES.

No. 924,731.  Specification of Letters Patent.  Patented June 15, 1909.

Application filed December 6, 1907. Serial No. 405,364.

*To all whom it may concern:*

Be it known that I, DAVID ABRAM CALLAWAY, a citizen of the United States, residing at Pueblo, in the county of Pueblo and State of Colorado, have invented a new and useful Improvement in Safety Hitching Devices for Vehicles Drawn by Horses, of which the following is a specification.

My invention relates to improvements in safety hitching devices for vehicles drawn by horses, in which a ratchet that is secured to the spokes of one of the wheels of the vehicle carries a ring upon rollers; the said ring carrying a dog that is operative, by means of ropes or cords, to engage said ratchet in such manner as to cause the said ropes or cords to wind around parts of the hitching device and draw the line straps, that are part of the harness attached to the horses, back and hold said line straps much the same as a driver does to hold a team; and the objects of my invention are,—first, to provide an automatic means for drawing the line straps, attached to a team of horses, in a manner similar to that performed by a driver for the purpose of holding said horses from moving away from a desired location; and second, to provide such safety hitching device to be applied to a wheel of a vehicle without alteration to said wheel; and third, to provide a safety means for hitching a team of horses in such manner that a backward movement of the vehicle will not draw the line straps and cause the team to back the vehicle. I attain these objects by the mechanisms illustrated in the accompanying drawings, in which—

Figure 1 is a perspective view of the wheel attachment of my invention apart from the wheel; and Fig. 2 is a side elevation of an express wagon with my invention shown thereon in position to be operative to hold a team from moving forward; and Fig. 3 is a perspective view of that part of my invention designed to guide and centralize the line straps, and a portion of the line straps in proper position to be connected with the hitching device.

Similar numbers refer to similar parts throughout the several views.

By means of clips 2 which surround spokes in the wheel, the ratchet 1 is secured to the wheel, and rotates with it. The ring 5 is held on said ratchet, and is turnable thereon about rollers 3 which have flanges, or washers, 4 to hold ring 5 in place; the rollers and washers, or flanges, being held on ratchet 1 by rivets. The dog 6 is pivotally attached to ring 5 by pin 9 and the element 7 of the dog enters a notch 8 in ring 5 and extends across ratchet 1 in such manner that the notches of the ratchet will engage said element 7 when the same is seated in said notch 8 of ring 5. Notch 8 is provided to strengthen element 7 when it engages a notch in the ratchet. The dog 6 is provided with holes in which are attached ropes or cords 10 and 11. The cord 10 serves to pull element 7 into engagement with the notches of the ratchet, and cord 11 serves to pull said element free from said notches.

On the wagon, Fig. 2, the hook 14 is secured, and ring 13 is secured on cord 11 in such manner that when ring 13 is hooked over hook 14 cord 11 will pull element 7 of dog 6 free from engagement with ratchet 1, and the vehicle may move forward or backward, since ring 5 is held quiet, while ratchet 1 may revolve with the wheel. A hook or snap 15 is secured to cord 10 and on the line straps the rings 16 are secured; and to attach my invention to be operative to hold the team from going forward the hook or snap 15 is hooked into said rings 16 of the line straps, and ring 13 is disengaged from hook 14, whereupon cord 10 will pull element 7 into engagement with ratchet 1 and a forward movement of the team will wind cords 10 and 11 around the outward extending rods 12, which are secured to ratchet 1, and draw the line straps back and hold the team in a manner similar to the driver pulling the line straps.

The cords 10 and 11 may be attached between ring 13 and hook 15 in such manner that when hook 15 is attached to rings 16 the cord 11 will hang loose, and, conversely, when ring 13 is hooked over hook 14 line 10 will hang loose, so that always the desired cord will pull on dog 6.

The line guide 17 is secured to the wagon bed near its front end and the lines 18 are placed one on each side of its middle prong and are then hooked, by rings 16, in hook 15 of cord 10. The rings 16 being so placed on the line straps that the lines will pull equally. As the lines are at the side of the vehicle when engaged with hook 15, one of rings 16 is set farther back so as to equalize the pull on the lines when pulled by cord 10 winding on ring 5. Prongs shown on 17 serve to cause the lines to pull evenly and hold the team straight ahead with vehicle if team should attempt to turn to either side. It will be seen therefore that one ring 16 is set farther back on its line strap than the other since the line straps are at the side of the wagon bed when hooked over hook 15; the lines being adjusted to pull evenly when hooked to the cord 10, the prongs on 17 serve to cause them to pull evenly on the team even if the team should turn to one side or the other in moving forward, and by this guide 17 the team is prevented from being turned out of a straight course.

By the arrangement of dog 6 and ratchet 1, should the team back, ring 5 would not turn with the wheel, thus obviating any danger of winding the lines taut when the team backs; but immediately on the team starting forward the ring 5, by means of dog 6 and ratchet 1, begins to wind up cord 10 and checks the team.

Having thus fully and accurately explained my invention what I claim and desire to secure by Letters Patent is—

1. In a safety hitching device of the character described comprising a ratchet wheel attachable by clips to spokes of wheel of vehicle, guide rods attached to said ratchet wheel, a rotatable ring attached on said ratchet wheel with antifriction rollers, a dog and engaging element attached to said ring and operative on said ratchet wheel, cords connected to said dog and engaging elements and operatively attachable to line straps of harness of team, a hook on body of vehicle and ring on cords attachable thereon, substantially as described.

2. In a safety hitching device of the character described comprising a ratchet wheel attachable by clips to spokes of wheel of vehicle, guide rods attached to said ratchet wheel, a rotatable ring attached on said ratchet wheel with anti-friction rollers, a dog and engaging element attached to said ring and operative on said ratchet wheel, cords connected to said dog and engaging elements and operatively attachable to line straps of harness of team, a hook on body of vehicle and ring on cords attachable thereon, a three prong line guide attached to the body of a vehicle through the prongs of which the lines of the harness on the team operate when connected with said cords.

In testimony whereof I have signed my name to this specification, in the presence of two subscribing witnesses.

DAVID ABRAM CALLAWAY.

Witnesses:
LYMAN I. HENRY,
S. MAUDE ENGLE.